United States Patent
Tommy et al.

(10) Patent No.: US 9,940,752 B2
(45) Date of Patent: Apr. 10, 2018

(54) HYBRID REALITY BASED OBJECT INTERACTION AND CONTROL

(71) Applicant: Tata Consultancy Services Limited, Mumbai (IN)

(72) Inventors: Robin Tommy, Trivandrum (IN); Hima Jose, Trivandrum (IN); Vansh Johri, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/078,501

(22) Filed: Mar. 23, 2016

(65) Prior Publication Data

US 2017/0169614 A1   Jun. 15, 2017

(30) Foreign Application Priority Data

Dec. 11, 2015   (IN) .......................... 4669/MUM/2015

(51) Int. Cl.
| | |
|---|---|
| *G06T 19/00* | (2011.01) |
| *H04W 4/00* | (2018.01) |
| *G06F 3/01* | (2006.01) |
| *G06F 3/0484* | (2013.01) |
| *H04L 12/28* | (2006.01) |

(52) U.S. Cl.
CPC ............ *G06T 19/006* (2013.01); *G06F 3/012* (2013.01); *G06F 3/0484* (2013.01); *H04L 12/282* (2013.01); *H04L 12/2816* (2013.01); *H04W 4/008* (2013.01)

(58) Field of Classification Search
CPC ...... G06T 19/006; G06F 3/012; G06F 3/0484; H04W 4/008; H04L 12/282; H04L 12/2816
See application file for complete search history.

(56) References Cited

U.S. PATENT DOCUMENTS

| | | | | |
|---|---|---|---|---|
| 9,606,817 | B1 * | 3/2017 | Efstathopoulos | ....... G06F 9/455 |
| 2015/0130957 | A1 * | 5/2015 | Berelejis | ................ H04L 67/12 |
| | | | | 348/211.1 |
| 2016/0195864 | A1 * | 7/2016 | Kim | ...................... G05B 15/02 |
| | | | | 709/221 |
| 2016/0205497 | A1 * | 7/2016 | Shen | ...................... G01R 33/07 |
| | | | | 455/41.1 |

(Continued)

FOREIGN PATENT DOCUMENTS

CN   203933781 U   11/2014

*Primary Examiner* — Jwalant Amin
(74) *Attorney, Agent, or Firm* — Finnegan, Henderson, Farabow, Garrett & Dunner LLP

(57) ABSTRACT

The present disclosure discloses a system and method for real time interaction of a real world with a virtual world through an augmentation concept has been provided. The system includes a mobile electronic device compatible with all operating system. The mobile electronic device is having a virtual reality application, on running the application and mounting the mobile electronic device in a virtual reality platform, the display provides two scenes. First scene is a menu scene and the second scene provides stereoscopic image with wide field view in a virtual environment. The system captures a real time image and scans characteristics of IoT based devices. Based on movement of virtual reality platform, the system provides guidance to perform actions on the IoT based devices from the virtual environment.

9 Claims, 4 Drawing Sheets

(56) References Cited

U.S. PATENT DOCUMENTS

2016/0285979 A1* 9/2016 Wang ...................... H04L 67/16
2016/0314621 A1* 10/2016 Hill ..................... G02B 27/0172
2016/0353305 A1* 12/2016 Zakaria ................. H04W 24/10

* cited by examiner

HYBRID REALITY BASED OBJECT INTERACTION AND CONTROL

PRIORITY CLAIM

This U.S. patent application claims priority under 35 U.S.C. § 119 to India Application No. 4669/MUM/2015, filed on Dec. 11, 2015. The entire contents of the aforementioned application are incorporated herein by reference.

TECHNICAL FIELD

This disclosure relates generally to hybrid reality communication, particularly systems and methods to facilitate a real world and a virtual world communication through an augmentation concept.

BACKGROUND

The real world is an environment that an observer can see, feel, hear, taste, or smell using the observer's owns senses. The virtual world is defined as a generated environment stored in a storage medium or calculated using a processor. The combined use of real world and the virtual world is very common these days in various applications. In general terms, it is referred as hybrid reality.

Hybrid reality also known as mixed reality is the merging of real and virtual worlds to produce new environments and visualizations where physical and IoT based objects co-exist and interact in real time. Hybrid reality takes place not only in the physical world or the virtual world, but is a mix of reality and virtual reality, encompassing both augmented reality and augmented virtuality. Augmented reality is a live direct or indirect view of physical, real world environment whose elements are augmented by computer generated sensory input such as sound, video, graphics or GPS data.

Existing hybrid reality technologies are dealing with manual interaction of a user with IoT based objects. The IoT based object is an object that enhances the interaction with not only people also with other IoT based objects. The IoT based object can not only refer to interaction with physical world objects but also to interaction with virtual objects. The IoT based physical object may be created either as an artifact or manufactured product or by embedding electronic tags such as RFID tags or sensors into non-IoT based physical objects. These hybrid reality technologies require, more human efforts. In the present age, interaction with the IoT based objects is possible with the use of mobile devices and Internet of things. But control and interaction of the IoT based objects from a virtual world Is a dream today due to a lot of technological challenges.

In today's market, there is an untapped need for connection between virtual world and real world or live interaction with the IoT based objects using virtual reality and live augmentation of the IoT based objects in the 3D world in the real time. A lot of technologies are existing in the prior art. But, the current state-of-the-art systems for live augmentation in virtual world with real world has many disadvantages, including: (a) Real time interaction in the mixed reality world; (b) Real time IoT based objects control using the virtual augmentation; (c) Live video based IoT based objects detection and interaction; (d) Location based content definition in the virtual world; and (e) Live information of the IoT based objects being interacted in the virtual world.

OBJECTIVE

In accordance with the present invention, the primary objective is to provide a system and a method for providing real time interaction of a real world with a virtual world through an augmentation concept.

Another objective of the invention is to provide a system and a method for controlling an IoT based object in real time using the augmentation concept.

Another objective of the invention is to provide a system and a method for a live video based IoT based objects detection and interaction using the augmentation concept.

Yet another objective of the invention is to provide a system and a method for a live information of the device being interacted in the virtual world over the Wi-Fi or Bluetooth.

Other objectives and advantages of the present invention will be more apparent from the following description when read in conjunction with the accompanying figures, which are not intended to limit the scope of the present disclosure.

SUMMARY

Embodiments of the present disclosure present technological improvements as solutions to one or more of the above-mentioned technical problems recognized by the inventors in conventional systems. For example, in one embodiment, a system for real time interaction of a real world with a virtual world through the augmentation concept. The system includes a mobile electronic device compatible with all operating system. The mobile electronic device is having a virtual reality application, on running the application and mounting the mobile electronic device in a virtual reality platform, the display of the mobile electronic device provides two scenes. First scene is a menu scene and the second scene provides stereoscopic image with wide field view in a virtual environment. The system captures a real time image and scans characteristics of IoT based devices in the captured image. Based on movement of virtual reality platform, the system provides guidance to perform actions on the scanned IoT based devices from the virtual environment.

In another embodiment, a computer implemented method a real time interaction of real environment with virtual environment, the method comprising capturing at least one real time image of one or more IoT based objects in the real environment using a mobile electronic device, visualizing a stereoscopic image with wide field view, of the live real time view of the one or more IoT based objects using a virtual reality platform, in a virtual environment, scanning at least one IoT based object of the one or more IoT based objects in the real environment to observe one or more characteristics of the scanned IoT based object using a hybrid reality application stored in the mobile electronic device, receiving one or more scenes on an input/output interface in accordance to the observed one or more characteristics of the scanned IoT based object by using the hybrid reality application and performing one or more actions on the basis of the geo-location of the scanned IoT based object, from the virtual environment according to the received one or more scenes.

In yet another embodiment, a computer readable medium storing instructions for executing a method performed by a computer processor, the method following the steps for a real time interaction of real environment with virtual environment, the method comprising capturing at least one real time image of one or more IoT based objects in the real environment using a mobile electronic device, visualizing a stereoscopic image with wide field view, of the live real time view of the one or more IoT based objects using a virtual reality platform, in a virtual environment, scanning at least one IoT based object of the one or more IoT based objects in the real environment to observe one or more characteristics of the scanned IoT based object using a hybrid reality application stored in the mobile electronic device, receiving one or more scenes on an input/output interface in accordance to the observed one or more characteristics of the scanned IoT based object by using the hybrid reality application and performing one or more actions on the basis of the geo-location of the scanned IoT based object, from the virtual environment according to the received one or more scenes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to systems and methods for a real time Interaction of real world with virtual world through an augmentation concept. In view of the foregoing, an embodiment herein provides a system and method for a real time interaction of a real world with a virtual world through an augmentation concept. The system includes an application compactable on mobile devices having magnetometer functionality, a Google cardboard or any of its substitute having magnetic trigger. The system is useful for the general and handicapped users except blind users. The system provides a platform to the user to communicate with IoT based object through the user interface screen and by the head movements. The system provides a virtual reality environment in which the user is provided with the user interface to interact with IoT based objects. The system provides an advanced way of interaction with the IoT based objects. It reduces the human efforts as it provides a remote and user friendly control to real world objects. The system also provides a digital security to IoT based devices which may be operated in virtual environment only. The system can be extended to provide a full hand-free object interaction that can interact with other IoT based objects, like IoT based TV, IoT based lighting system of room etc.

Figure 1:
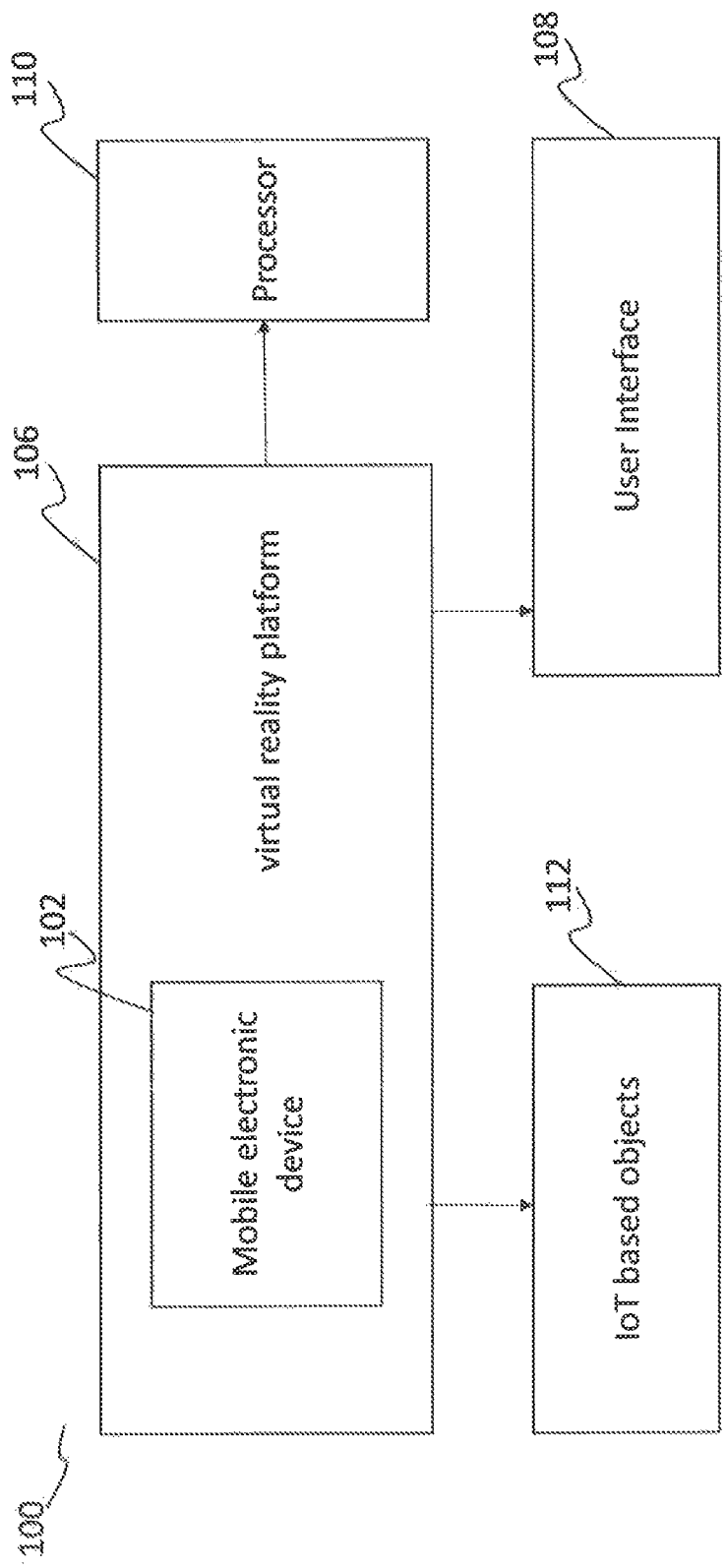
FIG. 1 illustrates an exemplary network implementation of a system for providing a real time interaction of real world with virtual world through an augmentation concept.

Referring now to FIG. 1, a network implementation of a system 100 for the real time interaction of the real world with the virtual world through the augmentation concept is shown in block diagram of FIG. 1. The system (100) includes a mobile electronic device 102 having a hybrid reality application 104, a virtual reality platform/Google cardboard 106, a user interface 108, a processor 110 and a plurality of IoT based objects 112 in the surrounding of the system 100.

In the preferred embodiment, the mobile electronic device 102 is configured to operate with all operating systems. The mobile electronic device 102 is having the hybrid reality application 104. The hybrid reality application 104 is compatible with all electronic devices which are compatible with all operating systems and also compatible with magnetic trigger, NFC trigger, GPS trigger of the virtual reality platform/Google cardboard 106.

In the preferred embodiment, the mobile electronic device 102 is configured to operate with all operating systems. The mobile electronic device 102 is having the hybrid reality application 104. The hybrid reality application 104 is compatible with all electronic devices which are compatible with all operating systems and also compatible with magnetic trigger, NFC trigger, GPS trigger of the virtual reality platform/Google cardboard 106.

In the preferred embodiment, the Google cardboard 106 is a virtual reality platform to support the hybrid reality application 104. The Google cardboard 106 is a fold-out cardboard mount for the mobile electronic device 102. It is intended as a low-cost system to encourage Interest and development in VR and VR applications. Though it should be appreciated that the system 100 can also use any other kind of virtual reality platforms such as Oculus rift, Samsung Gear, HTC Vive etc.

In the preferred embodiment, the mobile electronic device 102 is attached with the Google cardboard 106. The mobile electronic device 102 is attached in such a way that the camera of the mobile electronic device is facing the plurality of IoT based objects 112 which are in the surrounding of the system. The plurality of IoT based objects 112 may be seen in the virtual environment using the Google cardboard 106 (virtual reality platform). Each IoT based object is distinct to all the plurality of IoT based objects 112. The real time image captured by the camera of the mobile electronic device 102 is configured to be displayed on the display of the user interface 108 through the hybrid reality application 104.

Figure 2A:
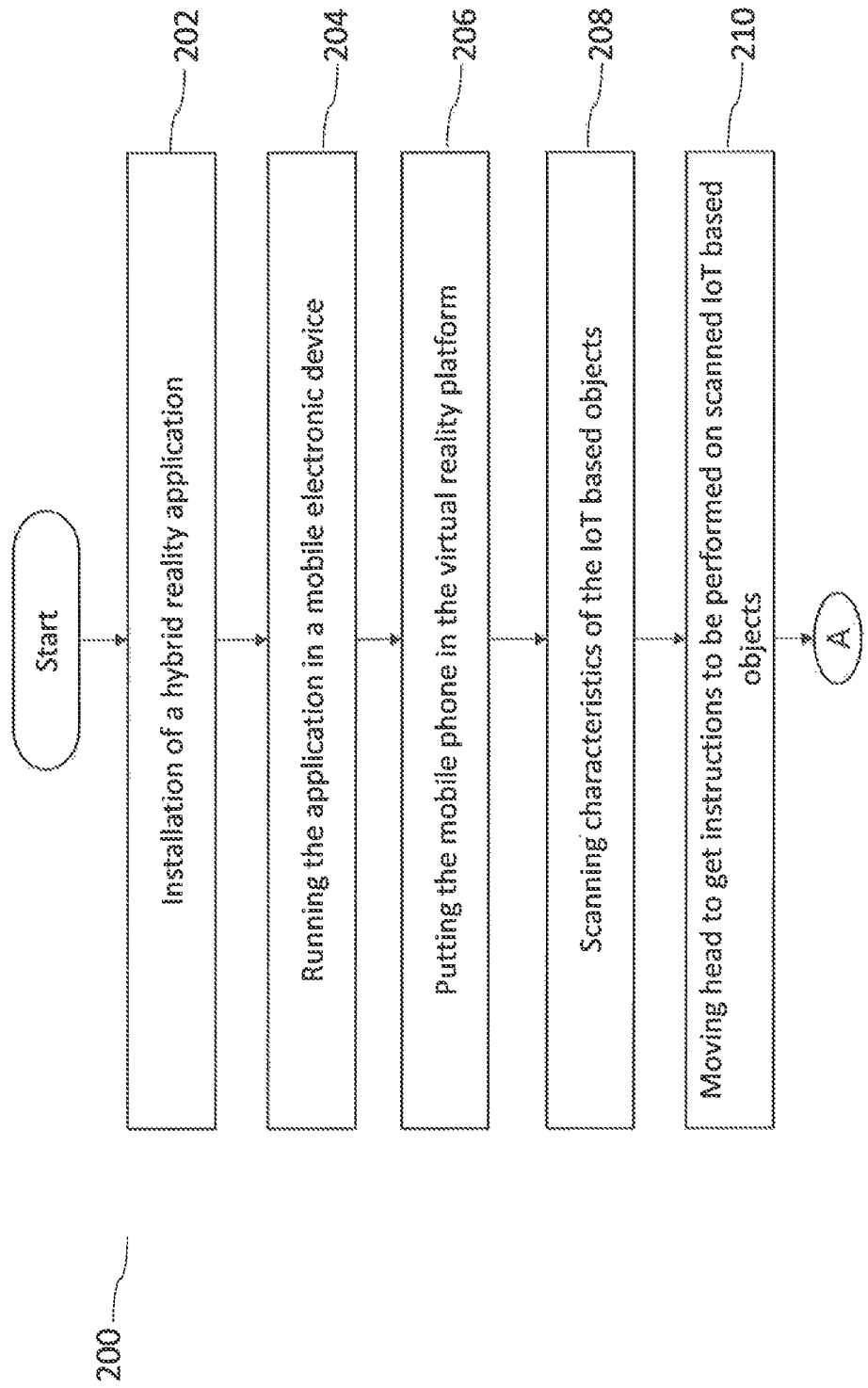
FIGS. 2a and 2b illustrates a flow diagram showing a method for providing real time detection, interaction and control of IoT based devices.
Figure 2B:
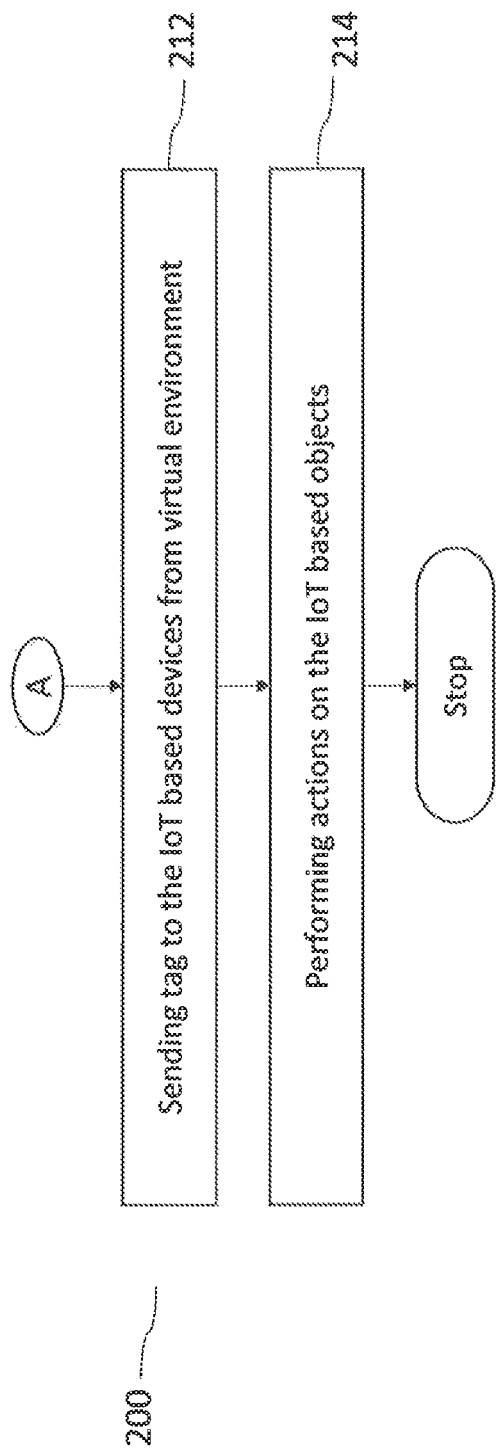

Referring now to FIGS. 2a and 2b illustrates a flowchart 200 for a real time interaction of a real world with a virtual world through an augmentation concept. Initially at step 202, a user may install a hybrid reality application 104 on the mobile electronic device 102. The mobile electronic device 102 is configured to operate in all operating systems and also compatible with magnetic trigger of Google cardboard (virtual reality platform) 106.

At step 204, when the user runs the hybrid reality application 104 on mobile electronic device 102, the hybrid reality application 104 splits the screen of the display of user interface 108 into two scenes.

At step 206, the user put the mobile electronic device 102 in the Google cardboard (virtual reality platform) 106 and wear the Google cardboard 106 on the head. The hybrid reality application 104 can display two scenes on the display of the user interface 108. First scene is a simple menu screen providing two options to the user to play and to exit from the virtual reality application 104. The second scene provides stereoscopic image with wide field view in the virtual environment. Initially the user is able to see real time image which is showing the live streaming captured by the mobile electronic device 102 camera.

At step 208, the mobile electronic device scans one or more characteristics of at least one IoT based object from the plurality of IoT based objects 112. At step 210, when the user moves his head the user will be able to see two scenes on the display of user interface 108. The scenes provide some guidance and an image to describe the actions to be performed on the scanned IoT based object.

At step 212, based on selection out of the two buttons on one of the scenes, the hybrid reality application may send a tag to the PHP script embedded on a Raspberry Pie controller of the scanned IoT based object 112. At step 214, the PHP script of the controller accepts the tag and perform at least one operation on the scanned IoT based object 112.

Figure 3:
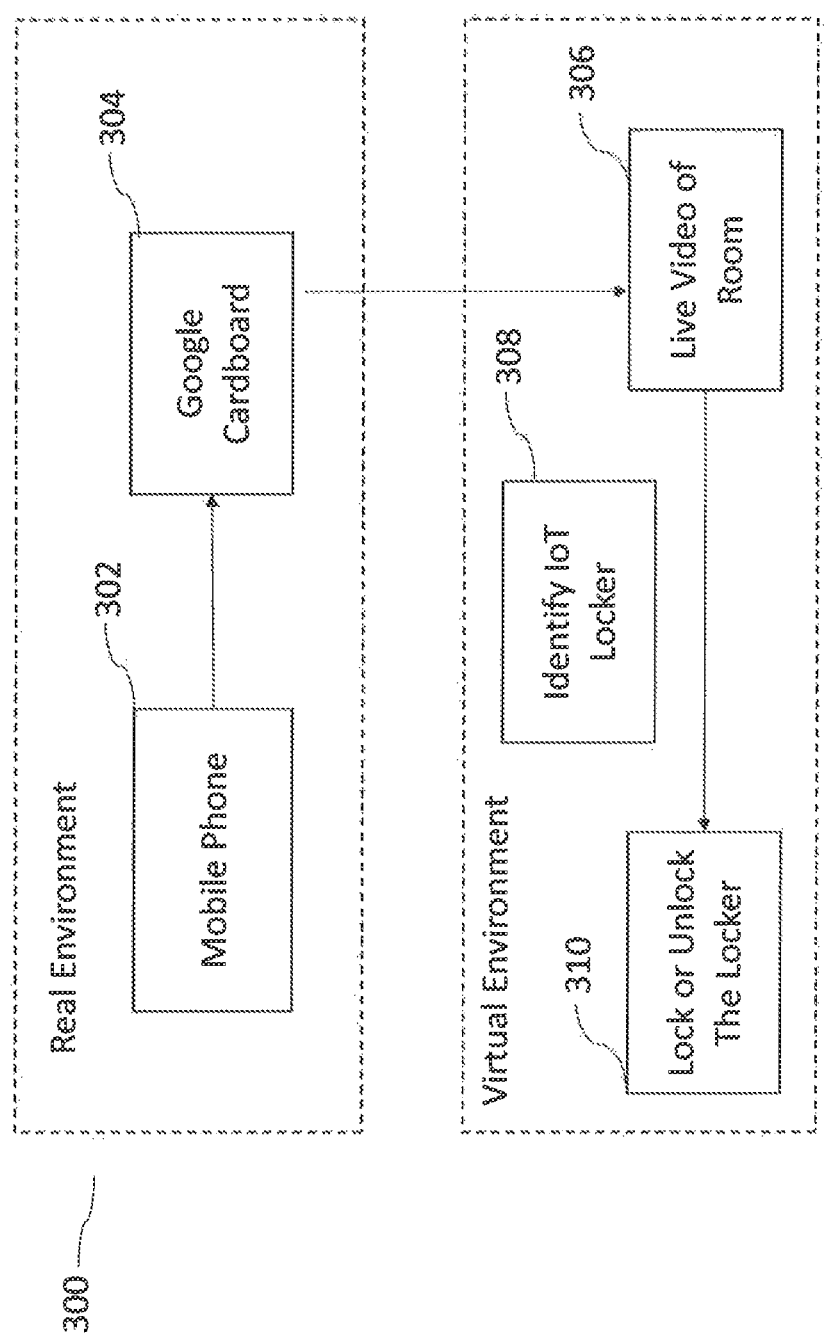
FIG. 3 illustrates a schematic diagram showing a system for providing a real time interaction of real world with virtual world through an augmentation concept.

In an example as shown in FIG. 3, illustrates a schematic diagram 300, wherein the user is sitting in a room and having a Google cardboard. The user can see live view of the room on the first canvas 306 of the display of a mobile phone 302, wherein the display of the mobile phone 302 is divided into three canvas. The user detects at least one IoT based object from plurality of IoT based objects. In this example the IoT based object is a locker 308. The user is also able to view and explore the new virtual environment. By rotating his head the user may able to see the left side canvas and the right side canvas. On the right side canvas the user may get some guidance about how to work on the identified locker 308, the locking and unlocking mechanism. The right side canvas also provides an image to describe the functionality on the basis of the geo-location of the user. The user may notify the status of the locker, the locked and unlocked status, in the virtual environment. On the left side canvas the user may see two buttons 310, these two buttons are to operate the locker, one button is to lock the locker and second button is to unlock the locker. The user may select any of these two buttons, based on his selection of buttons the mobile application may send a tag to the PHP script embedded in Raspberry Pie controller of the locker 308. The PHP script of controller accepts the tag sent by the mobile application and performs the operation of lock and unlock on the locker accordingly. The user can resume the live footage also by selecting the resume button provided on the top of the canvas of the live video.

In another elaborative example of a system for a real time interaction of real world with virtual world through an augmentation concept. The system includes a mobility device and also compatible with magnetic triggering capability of VR device, having an application, a VR device, a user interface and a plurality of IoT based objects. When application is installed and run on mobile phone the application provides two scenes. First scene is a menu screen providing two options to the user, one is play further and another one is to exit from the application. The second scene is a core of the application which has a 3D virtual environment consists of three canvas. On one of the three canvas the user can see the live view of the IoT based object placed in the same room. On moving head the user can able to see two other canvas on his right and left side. The right side canvas provides some guidance and an image to describe the functionality mechanism. The left side canvas provides two buttons, the user can select any of these two buttons and based on his selection the application will send a tag to the PHP script embedded in Raspberry Pie controller of IoT based object. The PHP script of controller accepts the tag sent by the application and perform the operation on the IoT based device accordingly. In this way, the user can interact with the IoT based object using this virtual reality application.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including Instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for facilitating a real time interaction of a real environment with a virtual environment, the method comprising:

capturing at least one real time image of one or more IoT based objects in the real environment using a mobile electronic device and scanning one or more characteristics of the mobile electronic device in the captured real time image;

visualizing a stereoscopic image with a field of view, of the captured real time image of the one or more IoT based objects using a virtual reality platform, in the virtual environment and providing a guidance to perform one or more actions on the scanned characteristics of the mobile electronic device from the virtual environment;

scanning at least one IoT based object out of the one or more IoT based objects in the real environment to observe one or more characteristics of the scanned IoT based object using a hybrid reality application stored in the mobile electronic device;

receiving one or more scenes on an input/output interface in accordance to the observed one or more characteristics of the scanned IoT based object by using the hybrid reality application;

performing one or more actions on the basis of a geo-location of the scanned IoT based object, from the virtual environment based on the received one or more scenes;

controlling the scanned IoT based object by facilitating augmentation using a magnetic triggering capability of a Virtual Reality (VR) device; and providing a hand-free object interaction to facilitate further interaction with the at least one IoT based object.

2. The method claimed in claim 1, wherein one or more IoT based objects include at least one of an IoT based locker, a television, an A.C., a refrigerator or a lighting system.

3. The method claimed in claim 1, wherein the virtual reality platform includes at least one of a Google Cardboard, an Oculus Rift, a Samsung Gear and a HTC Vive.

4. The method claimed in claim 1, wherein one or more characteristic of IoT based devices includes at least one of infrared frequency, voltage parameter, current parameter, power parameter or temperature parameter.

5. The method claimed in claim 1, wherein one or more scene on the display of user interface includes live streaming of image.

6. A system for facilitating a real time interaction of a real environment with a virtual environment, the system comprising:
   a input/output interface;
   a memory;
   a processor in communication with the memory;
   a mobile electronic device electronically coupled with the processor, the mobile electronic device configured to capture at least one real time image of one or more IoT based object by using a mobile electronic device and scan one or more characteristics of the mobile electronic device in the captured real time image;
   a virtual reality platform electronically coupled with the processor, the virtually reality platform to visualize a stereoscopic image with a field of view, of the captured at least one image of a physical IoT based object, in a virtual environment and provide guidance to perform one or more actions on the scanned characteristics of the mobile electronic device from the virtual environment; and
   a hybrid reality application stored within the mobile electronic device to scan at least one IoT based object and to observe one or more characteristic of the physical IoT based object,
   the processor configured to control the scanned IoT based object by facilitating augmentation concept using a magnetic triggering capability of a Virtual Reality (VR) device; and
   the processor configured to provide a hand-free object interaction to facilitate further interaction with at least one IoT based object.

7. The system claimed in claim 6, wherein the hybrid reality application is compatible with magnetic trigger, near field communication (NFC), head moment tracking.

8. The system claimed in claim 6, wherein the mobile electronic device includes at least one of a mobile phone, a tablet or a laptop.

9. A non-transitory computer readable medium storing instructions for executing a method performed by a computer processor, the method comprising:
   capturing at least one real time image of one or more IoT based objects in the real environment using a mobile electronic device and scanning one or more characteristics of the mobile electronic device in the captured real time image;
   visualizing a stereoscopic image with a field of view, of the captured real time image of the one or more IoT based objects using a virtual reality platform, in a virtual environment and providing a guidance to perform one or more actions on the scanned characteristics of the mobile electronic device from the virtual environment;
   scanning at least one IoT based object out of the one or more IoT based objects in the real environment to observe one or more characteristics of the scanned IoT based object using a hybrid reality application stored in the mobile electronic device;
   receiving one or more scenes on an input/output interface in accordance to the observed one or more characteristics of the scanned IoT based object by using the hybrid reality application;
   performing one or more actions on the basis of a geo-location of the scanned IoT based object, from the virtual environment according to the received one or more scenes;
   controlling the scanned IoT based object by facilitating augmentation concept using a magnetic triggering capability of a Virtual Reality (VR) device; and
   providing a hand-free object interaction to facilitate further interaction with at least one IoT based object.

* * * * *